US012214356B2

(12) United States Patent
Kitahara

(10) Patent No.: US 12,214,356 B2
(45) Date of Patent: Feb. 4, 2025

(54) SHREDDING DEVICE

(71) Applicant: TIGER MACHINE CO., LTD., Takahashi (JP)

(72) Inventor: Tetsugoro Kitahara, Okayama (JP)

(73) Assignee: TIGER MACHINE CO., LTD., Takahashi (JP)

( * ) Notice: Subject to any disclaimer, the term of this patent is extended or adjusted under 35 U.S.C. 154(b) by 369 days.

(21) Appl. No.: 17/290,454

(22) PCT Filed: Oct. 28, 2019

(86) PCT No.: PCT/JP2019/042145
§ 371 (c)(1),
(2) Date: Apr. 30, 2021

(87) PCT Pub. No.: WO2020/090723
PCT Pub. Date: May 7, 2020

(65) Prior Publication Data

US 2021/0387202 A1 Dec. 16, 2021

(30) Foreign Application Priority Data

Nov. 2, 2018 (JP) ................................ 2018-207744

(51) Int. Cl.
*B02C 18/00* (2006.01)
*B02C 18/14* (2006.01)
*B02C 18/18* (2006.01)

(52) U.S. Cl.
CPC .......... *B02C 18/0092* (2013.01); *B02C 18/14* (2013.01); *B02C 18/18* (2013.01); *B02C 2018/188* (2013.01)

(58) Field of Classification Search
CPC ... B02C 2018/188; B02C 18/14; B02C 18/18; B02C 18/0084; B02C 18/0092; Y10S 241/38
(Continued)

(56) References Cited

U.S. PATENT DOCUMENTS 5,913,484 A * 6/1999 Kurtz ........................ B26D 3/22 241/73
8,272,923 B2 * 9/2012 Schneider ................ B26D 7/00 451/142
(Continued)

FOREIGN PATENT DOCUMENTS

DE 10018005 A1 * 11/2000 ............. B02C 13/04
JP H04190858 A 7/1992
(Continued)

*Primary Examiner* — Jared O Brown
(74) *Attorney, Agent, or Firm* — Alleman Hall & Tuttle LLP

(57) ABSTRACT

The present invention has an object to provide a shredding device which can efficiently shred the bagged garbage discharged from homes or business offices. The shredding device in accordance with the present invention includes a housing, a rotary shaft rotatably attached to an inside of the housing, a plurality of rotary blades attached around the rotary shaft to be spaced apart from one another in an axial direction of the rotary shaft, and a fixed blade attached to a bottom plate of the housing so that an article to be processed is shredded between the fixed blade and the rotary blades, wherein a lifting device which changes a distance between a tip of the rotary blade and a tip of the fixed blade by raising and lowering the rotary shaft is provided.

8 Claims, 11 Drawing Sheets

(58) Field of Classification Search
USPC .................................. 241/286, 243; 214/243
See application file for complete search history.

(56) References Cited

U.S. PATENT DOCUMENTS

| | | | | |
|---|---|---|---|---|
| 2004/0188556 | A1 * | 9/2004 | Jong | B02C 18/186 241/243 |
| 2010/0136665 | A1 * | 6/2010 | Kimura | B09B 3/00 435/290.1 |
| 2017/0073981 | A1 * | 3/2017 | Cook | B02C 18/22 |

FOREIGN PATENT DOCUMENTS

| | | | | | |
|---|---|---|---|---|---|
| JP | 2001149806 | A | | 6/2001 | |
| JP | 2002066371 | A | | 3/2002 | |
| JP | 2008068249 | A | | 3/2008 | |
| JP | 2010234318 | A | | 10/2010 | |
| JP | 2012020261 | A | | 2/2012 | |
| JP | 2014141060 | A | | 8/2014 | |
| KR | 2009-0024766 | A | * | 3/2009 | |
| KR | 20170033615 | A | * | 3/2017 | |
| KR | 10-1898699 | B1 | * | 9/2018 | |
| WO | WO-2006040449 | A1 | * | 4/2006 | B02C 18/0084 |
| WO | 2006134941 | A1 | | 1/2009 | |
| WO | WO-2010137378 | A1 | * | 12/2010 | C10L 5/363 |

* cited by examiner

Fig. 1D
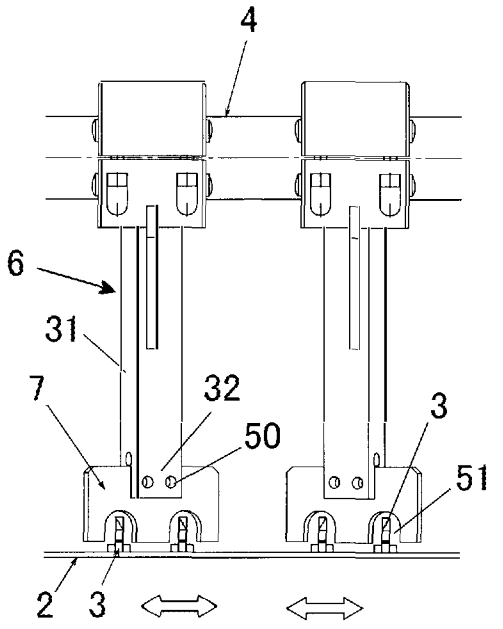
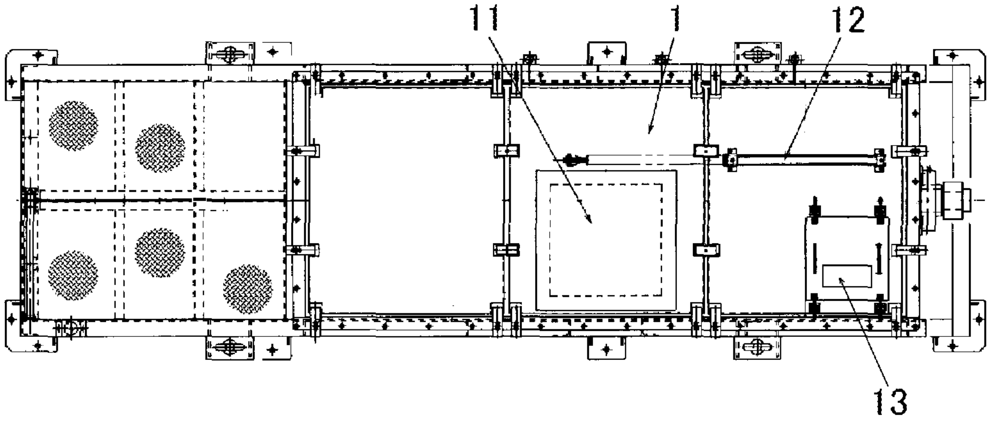
Fig. 1E

Fig. 2D
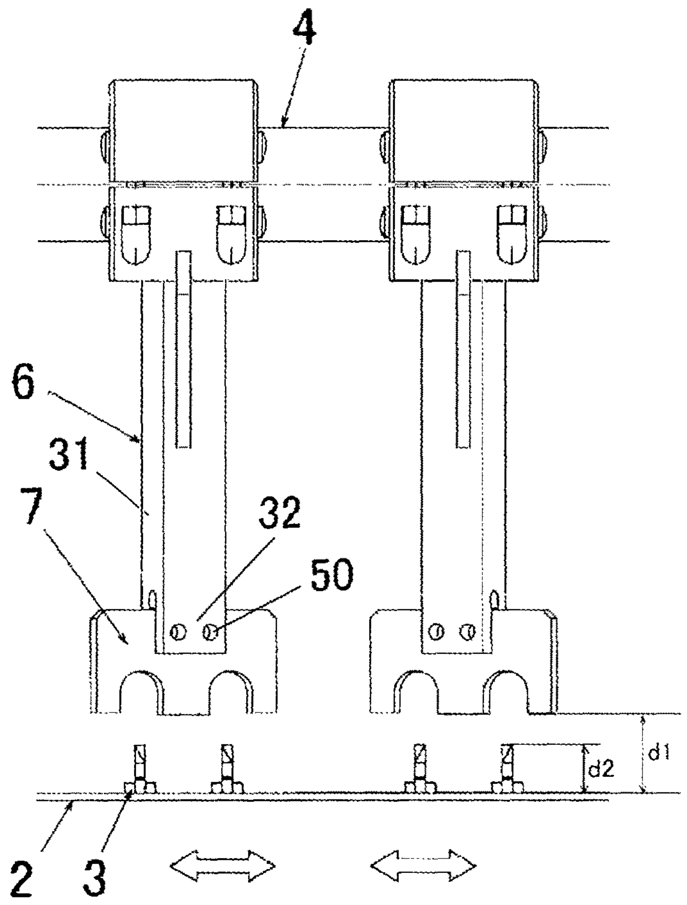
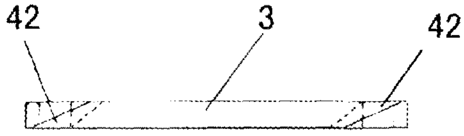
Fig. 3C
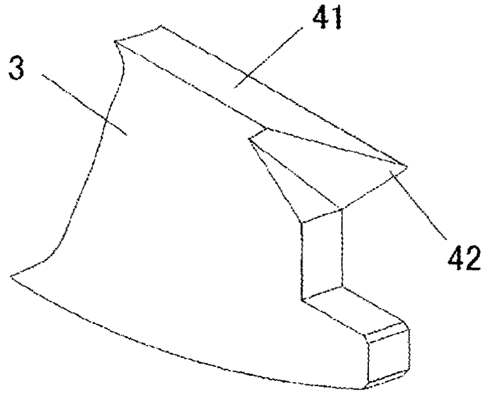
Fig. 3D
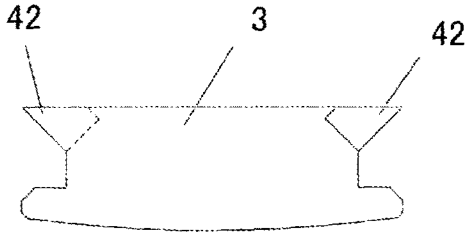
Fig. 3A
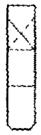
Fig. 3B

SHREDDING DEVICE

TECHNICAL FIELD

The present invention relates to a shredding device that shreds organic garbage contained in a garbage bag collected from homes or business offices.

BACKGROUND ART

Organic wastes such as garbage discharged from homes or business offices are contained in a garbage bag and discharged as bagged garbage. As an example of an organic waste disposal method, a method of applying fermentation processing to the organic waste using microorganisms, and using a decomposed product thus obtained as a fertilizer and a soil improving material, is employed. In order to dispose of garbage and the like by a device employing this fermentation processing using the microorganisms, it is necessary to shred the garbage bags that contain the organic wastes in advance and to finely shred solids contained in the organic wastes.

If these garbage bags or solids are subjected to the fermentation processing without being shredded, the fermentation processing time of the articles to be processed becomes longer, and a problem of unprocessed garbage being discharged from a fermentation processing device may occur.

PTL 1 discloses a bag tearing machine which tears off a bag of polyethylene and the like that covers garbage in bagged garbage collected from homes or business offices. This bag tearing machine releases the garbage from the garbage bag by tearing the bag of the bagged garbage supplied to the bag tearing machine using a rotary blade and a fixed blade, and the released garbage is carried out to a subsequent shredding process by conveying means such as a belt conveyer.

PTL 2 discloses a uniaxial shredding machine for plastic wastes. This uniaxial shredding machine includes a rotating rotor having a plurality of rotary blades disposed in an axial direction and a fixed blade disposed on a shredding machine body so that an article to be processed is shredded between the fixed blade and the rotary blades of this rotor. Furthermore, the uniaxial shredding machine is configured such that the article to be processed is shredded between this fixed blade and the rotary blades to a predetermined size or less and then is discharged to a discharge passage.

i. PTL 3 discloses a shredding machine which shreds wastes such as waste tires, waste plastic products and the like by using a rotary blade and a fixed blade.

CITATION LIST

Patent Literature

[PTL 1] Japanese Patent Application Publication No. 2008-68249

[PTL 2] Japanese Patent Application Publication No. 2010-234318

[PTL 3] Japanese Patent Application Publication No. 2012-20261

SUMMARY OF INVENTION

Technical Problem

Garbage from homes or business offices is usually discharged as bagged garbage contained in a polyethylene bag with a capacity of 30 L or 45 L.

The bag tearing machine described in PTL 1 aimed at tearing off a garbage bag of polyethylene or the like that wraps the garbage and is not applied to shredding the garbage contained in the garbage bag. Thus, the garbage in the garbage bag needs to be shredded by using a shredding device in a subsequent process, and this increases a facility cost and takes a longer processing time.

Moreover, the bagged garbage may be shredded by using the shredding machines in PTL 2 and PTL 3, but they are not suitable for the processing of tearing the garbage bag and require considerable electricity and time for the garbage in the bag to be shredded to a desired grain size, which prevents efficient processing.

Thus, the present invention has an object to provide a shredding device which can efficiently shred the bagged garbage discharged from homes or business offices.

Solution to Problem

The aforementioned problem can be solved by using a shredding device including constitution described below.

A shredding device, including

- a housing;
- a rotary shaft rotatably attached to an inside of the housing;
- a plurality of rotary blades attached around the rotary shaft to be spaced apart from one another in an axial direction of the rotary shaft;
- a fixed blade attached to a bottom plate of the housing so that an article to be processed is shredded between the fixed blade and the rotary blades, wherein
- a lifting device which changes a distance between a tip of the rotary blade and a tip of the fixed blade by raising and lowering the rotary shaft is provided.

Advantageous Effects of the Invention

According to the present invention, the shredding device which can efficiently shred the bagged garbage discharged from homes or business offices can be provided.

BRIEF DESCRIPTION OF DRAWINGS

FIG. 1D is a view illustrating a positional relationship between a rotary blade and a fixed blade in the shredding device illustrated in FIG. 1A.

FIG. 1E is a plan view of the shredding device illustrated in FIG. 1A.

FIG. 2D is a view illustrating a positional relationship between the rotary blade and the fixed blade in the shredding device illustrated in FIG. 2A.

FIG. 3A is a front view of an embodiment of the fixed blade, FIG. 3B is a side view of the fixed blade illustrated in FIG. 3A, FIG. 3C is a plan view of the fixed blade illustrated in FIG. 3A, and FIG. 3D is a partial perspective view of the fixed blade illustrated in FIG. 3A.

DESCRIPTION OF EMBODIMENTS

Figure 1A:
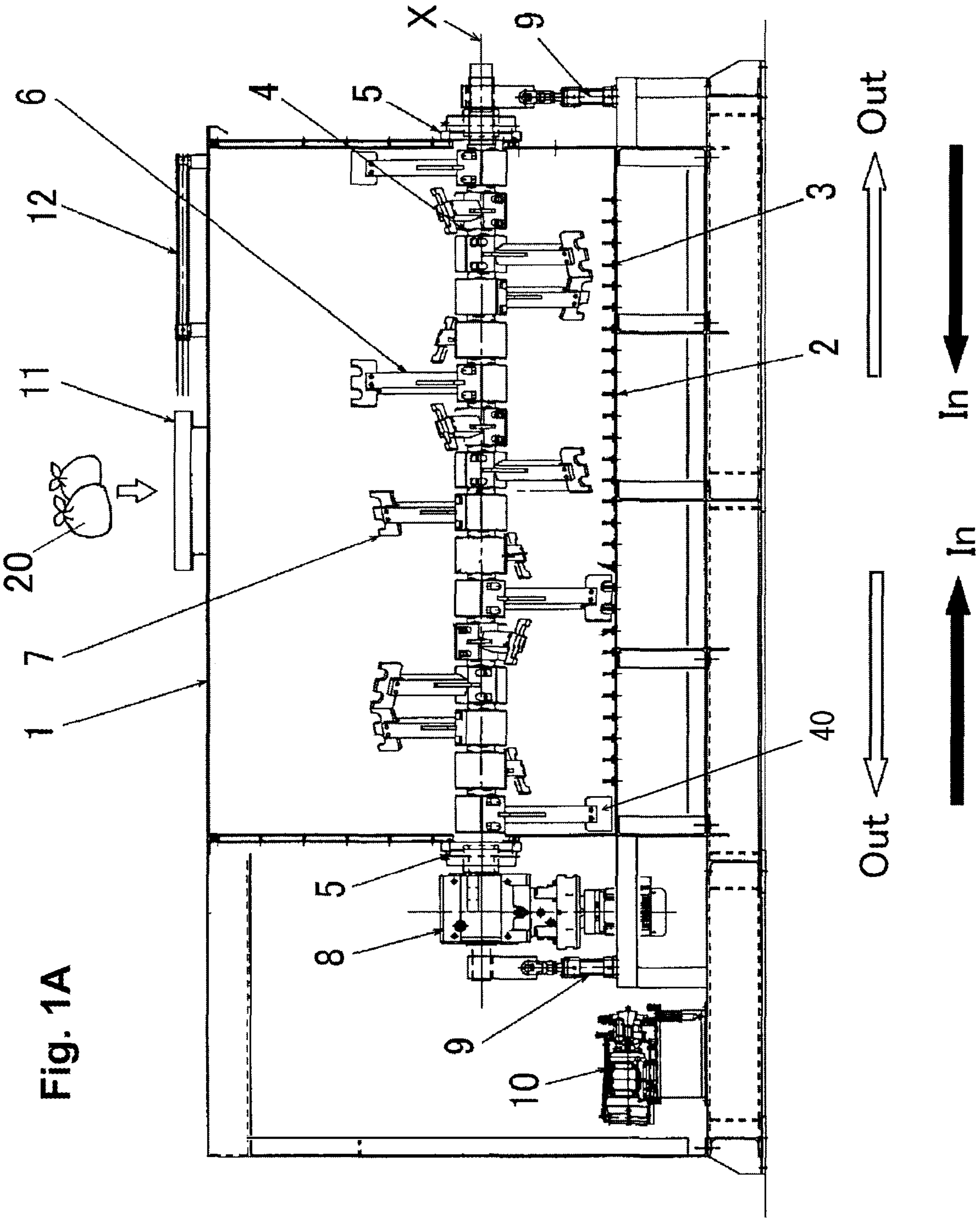
FIG. 1A is a front view of an embodiment of a shredding device of the present invention and is a view illustrating a state where a rotary shaft has been lowered.

The present invention is related to a shredding device including constitution in the following (1) but includes the following (2) to (8) as embodiments of the invention, and these embodiments will be also explained.

(1) A shredding device, including a housing;

a rotary shaft rotatably attached to an inside of the housing;

a plurality of rotary blades attached around the rotary shaft to be spaced apart from one another in an axial direction of the rotary shaft; and a fixed blade attached to a bottom plate of the housing so that an article to be processed is shredded between the fixed blade and the rotary blades, wherein a lifting device which changes a distance between a tip of the rotary blade and a tip of the fixed blade by raising and lowering the rotary shaft is provided.

(2) The shredding device described in the aforementioned (1), wherein the lifting device is a lifting cylinder.

(3) The shredding device described in the aforementioned (1) or (2), wherein the rotary blade is attached to a tip of an arm member mounted on the rotary shaft in a perpendicular direction thereto.

(4) The shredding device described in the aforementioned (3), wherein, with the arm member being provided in plurality, the arm members are mounted around the rotary shaft to be spaced apart from one another in the axial direction, with positions thereof in a circumferential direction being shifted.

(5) The shredding device described in any one of the aforementioned (1) to (4), wherein a notch portion through which the fixed blade passes when the rotary shaft is lowered is provided at a tip end portion of the rotary blade.

(6) The shredding device described in any one of the aforementioned (1) to (5), wherein a sharp angle portion, which has both end portions each having, in the circumferential direction of the rotary shaft, a sharp angle shape, is provided at a top end portion of the fixed blade.

(7) The shredding device described in any one of the aforementioned (1) to (6), wherein a sharp angle portion having a sharp angle shape with respect to the circumferential direction of the rotary shaft is provided at an end portion of the rotary blade in the rotary shaft direction.

(8) The shredding device described in any one of the aforementioned (3) to (7), wherein three types of arm members, which are an arm member a, an arm member b, and an arm member c below are mounted on the rotary shaft.

Arm member a: An arm member having a structure to be mounted on the rotary shaft excluding a right-side end portion on a right side from a center in the axial direction of the rotary shaft and mounted so that a blade width direction of the rotary blade mounted to the tip end portion of the arm member is inclined to lower left with respect to a horizontal center line of the rotary shaft.

Arm member b: An arm member having a structure to be mounted on the rotary shaft excluding a left-side end portion on a left side from a center in the axial direction of the rotary shaft and mounted so that the blade width direction of the rotary blade mounted to the tip end portion of the arm member is inclined to lower right with respect to the horizontal center line of the rotary shaft.

Arm member c: An arm member having a structure to be mounted on both ends in the axial direction of the rotary shaft and mounted so that a width direction of the stirring blade mounted to the tip end portion of the arm member is in parallel with the horizontal center line of the rotary shaft.

Here, the direction of the rotary shaft of the shredding device is a right-and-left direction.

One of embodiments of the shredding device of the present invention will be described below on the basis of FIG. 1A to FIG. 1E and FIG. 2A to FIG. 2D.

Hereinafter, an article to be processed for shredding is referred to as “garbage” or “bagged garbage” in some cases.

The shredding device of the present invention includes a rotary shaft rotatably attached to an inside of a housing, a plurality of rotary blades attached around the rotary shaft to be spaced apart from one another in an axial direction of the rotary shaft, a fixed blade attached to a bottom plate of the housing so that an article to be processed is shredded between the fixed blade and the rotary blades, and a lifting device which changes a distance between a tip of the rotary blade and a tip of the fixed blade by raising and lowering the rotary shaft. The rotary shaft is raised by the lifting device when the article to be processed is thrown in, while the rotary shaft is lowered when the article to be processed is shredded, whereby the article to be processed can be subjected to shredding efficiently.

FIG. 1A to FIG. 1E illustrate a state of the shredding device when the rotary shaft is lowered and the article to be processed is shredded, and FIG. 2A to FIG. 2D illustrate a state of the shredding device when the rotary shaft is raised and the article to be processed is thrown in or when the rotary shaft is raised and the article to be processed is shredded.

First, the state of the shredding device when the rotary shaft is lowered will be described on the basis of FIG. 1A to FIG. 1E.

Figure 1B:
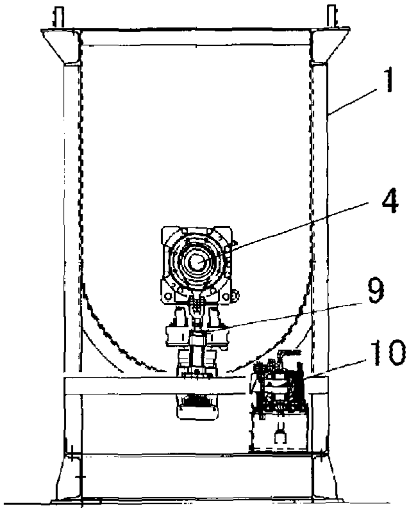
FIG. 1B is a left side view of the shredding device illustrated in FIG. 1A.
Figure 1C:
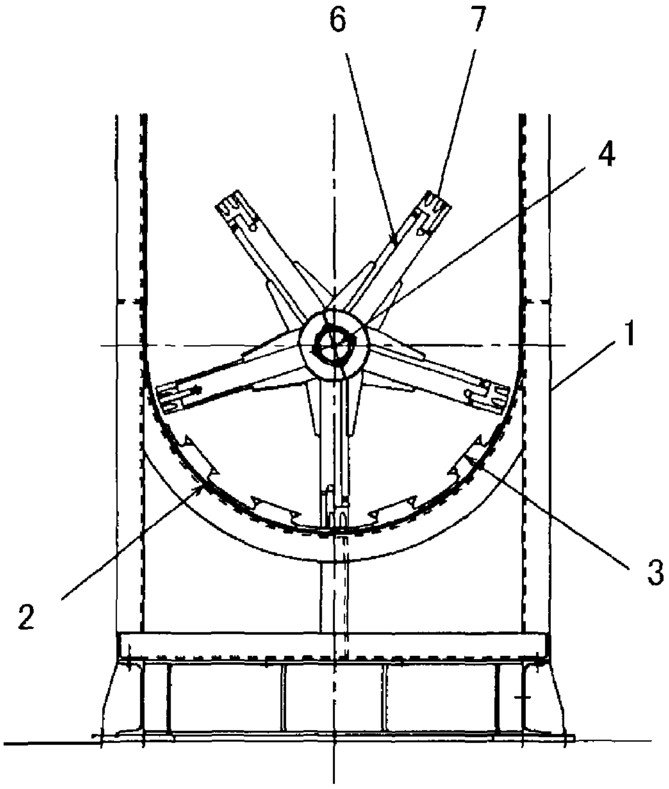
FIG. 1C is a right side view of the shredding device illustrated in FIG. 1A.

FIG. 1A is a front view of the shredding device, FIG. 1B is a left side view of the shredding device illustrated in FIG. 1A, and FIG. 1C is a right side view of the shredding device illustrated in FIG. 1A. Moreover, FIG. 1D is a view illustrating a positional relationship between the rotary blade and the fixed blade in the shredding device illustrated in FIG. 1A. FIG. 1E is a plan view of the shredding device illustrated in FIG. 1A.

A garbage inlet 11 through which bagged garbage 20 (i.e., an article to be processed) is to be thrown in is provided on an upper part of the housing 1. On this garbage inlet 11, a door which can be opened or closed by a door-opening/closing cylinder 12 is provided. Reference numeral 13 in FIG. 1E denotes an inspection port.

As illustrated in FIG. 1A, inside the housing 1, the rotary shaft 4 is rotatably supported in a horizontal state by bearings 5 provided at right and left positions of the housing 1. The rotary shaft 4 is rotationally driven by an electric or hydraulic drive motor 8. In the shredding device illustrated in FIG. 1A, the rotary shaft 4 is directly connected to the drive motor 8, but the rotary shaft 4 may be rotationally driven by connecting a rotary shaft of the drive motor 8 and the rotary shaft 4 by a chain or a belt.

Reference character X in FIG. 1A denotes a horizontal center line of the rotary shaft when the rotary shaft is lowered.

As illustrated in FIG. 1A, a plurality of arm members 6 are mounted in a perpendicular direction to the rotary shaft and at an interval in the axial direction around the rotary shaft 4, and a rotary blade 7 is attached to a tip of each of the arm members 6. Moreover, as illustrated in FIG. 1C, each of the arm members 6 is mounted radially from the rotary shaft 4 with positions thereof in a circumferential direction being shifted around the rotary shaft 4. As described above, since the arm members 6 with the rotary blades 7 attached at the tips are disposed around the rotary shaft 4 with the positions in the circumferential direction shifted, shredding timing of each of the rotary blades 7 is shifted and thus, a load on the rotary shaft 4 at the shredding is averaged, and a large load is not applied instantaneously on the rotary shaft 4.

FIG. 1A illustrates an example in which the plurality of arm members 6 are mounted in the perpendicular direction to the rotary shaft 4, but the direction in which the arm members 6 are mounted to the rotary shaft 4 does not have to be the perpendicular direction to the rotary shaft.

Moreover, on a bottom plate 2 of the housing 1, a fixed blade 3 is mounted so as to shred the article to be processed between itself and the rotary blade 7. FIG. 1D illustrates a positional relationship between the fixed blade 3 and the rotary blade 7.

An embodiment of the fixed blade 3 will be described on the basis of FIG. 1D and FIG. 3A to FIG. 3D. FIG. 3A is a front view of the fixed blade 3, FIG. 3B is a side view of the fixed blade 3, FIG. 3C is a plan view of the fixed blade 3, and FIG. 3D is a partial perspective view of the fixed blade 3.

The fixed blade 3 is made of a single blade stood upright on the bottom plate 2 of the housing 1 and attached to the bottom plate 2 by welding or bolt-fixing.

Both ends of a top end portion 41 of the fixed blade 3 in the circumferential direction of the rotary shaft has sharp angle portions 42, each having a sharp angle shape. This sharp angle portion 42 is effective in tearing the garbage bag.

When the rotary shaft 4 is at a raised position, and the bagged garbage 20 is thrown in in a state where the rotary blade 7 is separated from the bottom plate 2, a large bag falls down on the fixed blade 3 or is in a state sitting on the fixed blade 3. When the rotary blade 7 is lowered thereto and pushes the bagged garbage 20, the sharp angle portions 42 on both ends of the fixed blade 3 are pierced into the bag, and when the bag is further pushed, the large bag is torn off, and garbage pops out of the inside. The garbage that popped out is sandwiched by the fixed blade 3 and the rotary blade 7 and sheared into fine pieces.

i. As illustrated in FIG. 1C, the bottom plate 2 of the housing 1 has a semi-circular shape around the center of the rotary shaft when the rotary shaft 4 is lowered, and by providing a plurality of the fixed blades 3 in the circumferential direction of the rotary shaft on the bottom plate with the semicircular shape, shearing capacity is enhanced.

An embodiment of the rotary blade 7 will be described on the basis of FIG. 1D, FIG. 4A, and FIG. 4B.

Figure 4A:
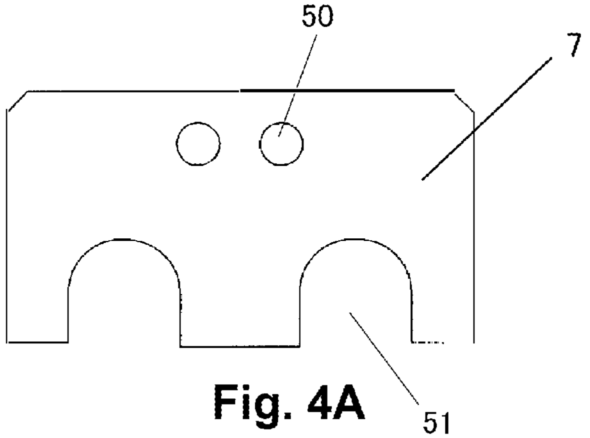
FIG. 4A is a front view of an embodiment of the rotary blade.
Figure 4B:
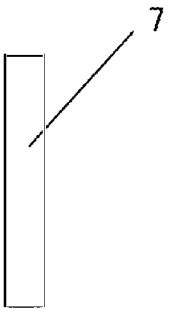
FIG. 4B is a side view of the rotary blade illustrated in FIG. 4A.

FIG. 4A is a front view of the rotary blade 7, and FIG. 4B is a side view of the rotary blade 7 illustrated in FIG. 4A.

The rotary blade 7 is a flat plate, has a bolt hole 50 provided in the upper part, and is bolt-fixed to a rotary-blade mounting portion 32 on an end portion of an arm shaft 31 of the arm member 6 as illustrated in FIG. 1D. Moreover, as illustrated in FIG. 4A, a notch portion 51 through which the fixed blade 3 is passed is provided on a tip end portion of the rotary blade 7.

When the rotary shaft is lowered so as to shred the article to be processed, the fixed blade 3 passes through the notch portion 51 of the rotary blade 7, whereby the article to be processed is shredded by shearing stress.

Figure 4C:
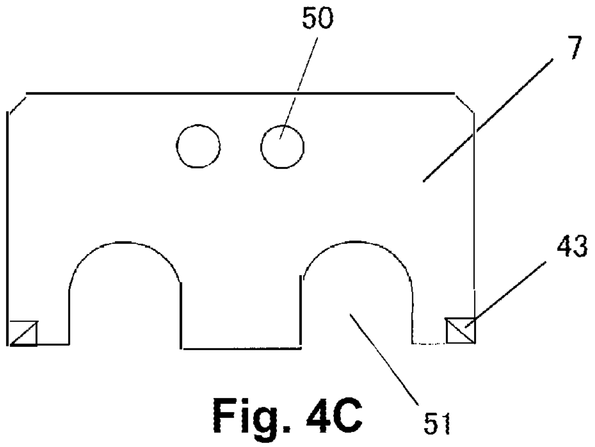
FIG. 4C is a front view of the rotary blade of another embodiment.
Figure 4D:
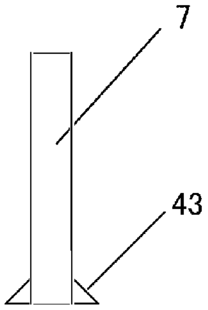
FIG. 4D is a side view of the rotary blade illustrated in FIG. 4C.

Another embodiment of the rotary blade 7 is illustrated in FIG. 4C and FIG. 4D.

i. FIG. 4C is a front view of the rotary blade 7, and FIG. 4D is a side view of the rotary blade 7 illustrated in FIG. 4C.
ii. As illustrated in FIG. 4C and FIG. 4D, the rotary blade 7 of this embodiment has a sharp angle portion 43 having a sharp angle shape on both end portions in a lower end portion in the rotary shaft direction. Since the rotary blade 7 has the sharp angle portions 43 as above, it can efficiently break through off the bag similarly to the fixed blade 3 illustrated in FIG. 3D.

Figure 5A:
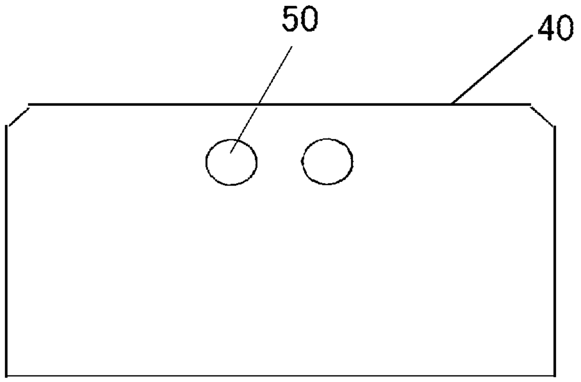
FIG. 5A is a front view of an embodiment of a stirring blade.
Figure 5B:
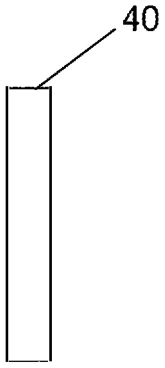
FIG. 5B is a side view of the stirring blade illustrated in FIG. 5A.

What is illustrated in FIG. 5 is a stirring blade 40 mounted on the arm member 6 provided on the end portion in the axial direction of the rotary shaft 4 and has the bolt hole 50 similarly to the rotary blade 7. This stirring blade 40 is not for shredding the garbage but has a function only of lifting the article to be processed and dropping it to a side opposite to an end plate. Thus, the stirring blade 40 is a flat plate and does not have a notch portion, and a fixed blade is not provided on the bottom plate faced with the stirring blade 40 as illustrated in FIG. 1A.

An example of an embodiment of the arm member 6 will be described below.

If the garbage inlet 11 is provided only at the center part of the housing 1, when the bagged garbage 20 is thrown into the center part of the housing 1, the garbage accumulates at the center part of the housing 1, and a large load is applied to the rotary blade 7 provided at the center part of the rotary shaft 4, while the rotary blade 7 provided on the right side or on the left side of the center part of the rotary shaft 4 does not function effectively.

Thus, in this embodiment, the arm member 6 that prevents accumulation of the garbage at the center part of the housing 1 is provided.

In this embodiment, three types of arm members, that is, an arm member a, an arm member b, and an arm member c described below are used as the arm members 6.

Arm Member a

Figure 6B:
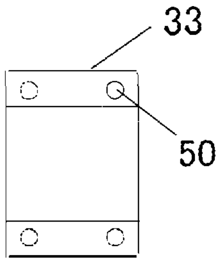
FIG. 6A is a front view of an embodiment of an arm member a, FIG. 6B is a plan view of the arm member a illustrated in FIG. 6A.
FIG. 6C is a bottom view of the arm member a illustrated in FIG. 6A.
FIG. 6D is a side view of the arm member a illustrated in FIG. 6A.
FIG. 6E is a perspective view of the arm member a illustrated in FIG. 6A.
Figure 6A:
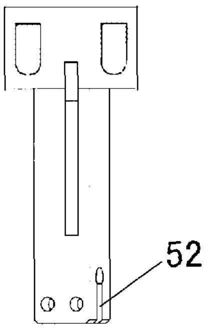
Figure 6D:
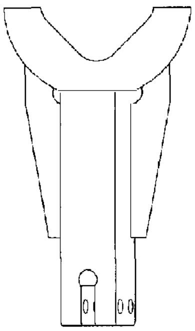
Figure 6E:
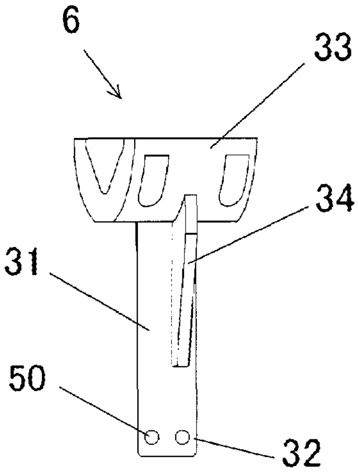
Figure 6C:
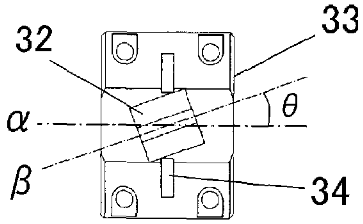

FIG. 6A to FIG. 6C are views illustrating a state where the arm member a is mounted on the rotary shaft, in which FIG. 6A is a front view of the arm member a, FIG. 6B is a plan view, and FIG. 6C is a bottom view.

Moreover, FIG. 6D is a side view of the arm member a, and FIG. 6E is a perspective view.

The arm member a is, as illustrated in FIG. 6E, constituted by an arm shaft 31, a rotary-shaft mounting portion 33, a rotary-blade mounting portion 32, and a reinforcing member 34.

The arm member a is mounted on the rotary shaft excluding a right-side end portion on the right side of the center in the axial direction of the rotary shaft 4 in the shredding device illustrated in FIG. 1A. This arm member a has a structure that, when the arm member a to which the rotary blade 7 is attached is mounted on the rotary shaft 4, a blade width direction β of the rotary blade 7 is inclined to lower left with respect to a horizontal center line α of the rotary shaft as illustrated in FIG. 6C. The angle θ to the lower left is 30 degrees, for example. The arm member a is mounted on the rotary shaft 4 by using a fixing member 35 illustrated in FIG. 9A to FIG. 9C.

Figure 8B:
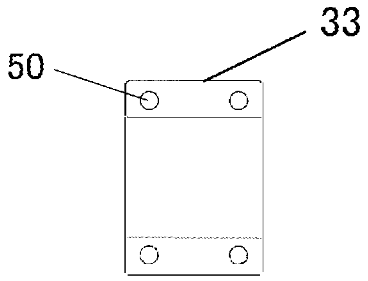
FIG. 8B is a plan view of the arm member c illustrated in FIG. 8A.
Figure 9A:
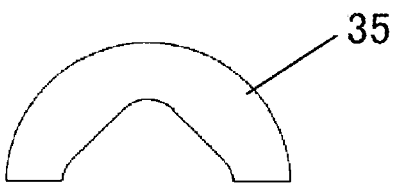
FIG. 9A is a front view of an embodiment of a fixing member.
Figure 9B:
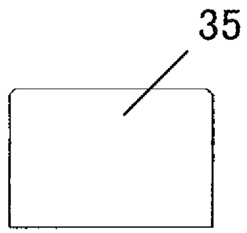
FIG. 9B is a side view of the fixing member illustrated in FIG. 9A.
Figure 9C:
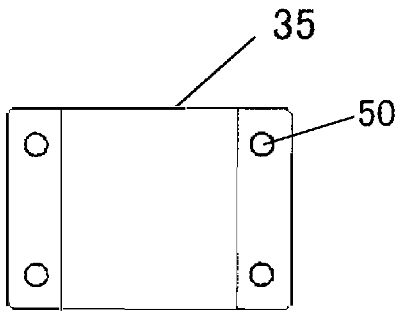
FIG. 9C is a bottom view of the fixing member illustrated in FIG. 9A.

FIG. 9A is a front view of the fixing member 35, FIG. 9B is a side view of the fixing member 35, and FIG. 9C is a bottom view of the fixing member 35. The fixing member 35 has the bolt hole 50 at a position corresponding to the bolt hole 50 of the rotary-shaft mounting portion 33 of the arm member a illustrated in FIG. 8B.

The arm member a is mounted by sandwiching the rotary shaft 4 by the rotary-shaft mounting portion 33 and the fixing member 35 illustrated in FIG. 9A to FIG. 9C and is mounted on the rotary shaft 4 by passing the bolt through the bolt hole 50.

Moreover, the rotary blade 7 is attached to the arm member a by inserting an upper end portion of the rotary blade 7 into a mounting groove 52 provided in the rotary-blade mounting portion 32 of the arm shaft 31 and by passing the bolt through the bolt hole 50.

Arm Member b

Figure 7B:
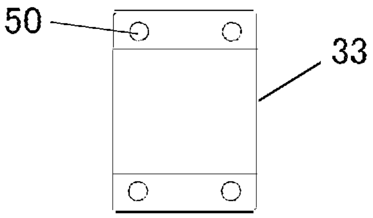
FIG. 7B is a plan view of the arm member b illustrated in FIG. 7A.
Figure 7E:
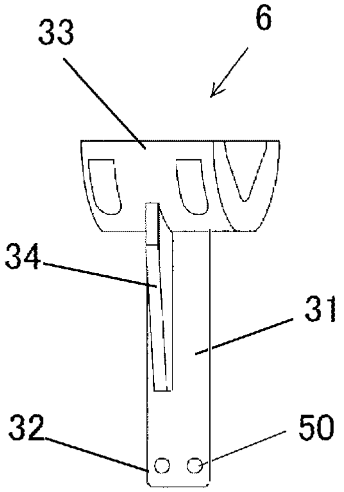
FIG. 7E is a perspective view of the arm member b illustrated in FIG. 7A.
Figure 7D:
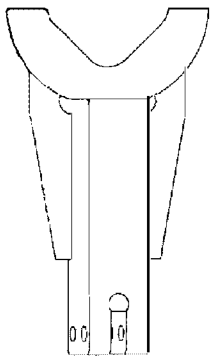
FIG. 7D is a side view of the arm member b illustrated in FIG. 7A.
Figure 7A:
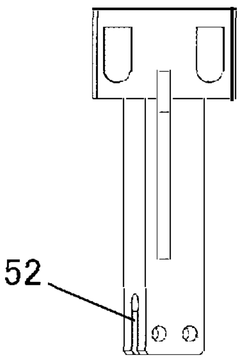
FIG. 7A is a front view of an embodiment of an arm member b.
Figure 7C:
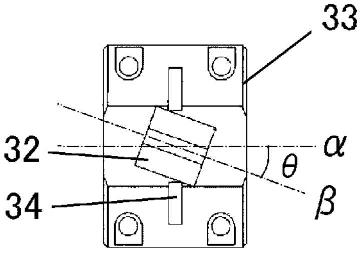
FIG. 7C is a bottom view of the arm member b illustrated in FIG. 7A.

FIG. 7A to FIG. 7C are views illustrating a state where the arm member b is mounted on the rotary shaft 4, in which FIG. 7A is a front view of the arm member b, FIG. 7B is a plan view, and FIG. 7C is a bottom view. Moreover, FIG. 7D is a side view of the arm member b, and FIG. 7E is a perspective view.

The arm member b is mounted on the rotary shaft excluding a left-side end portion on the left side of the center in the axial direction of the rotary shaft 4 in the shredding device illustrated in FIG. 1A. This arm member b has a structure that, when the arm member b to which the rotary blade 7 is attached is mounted on the rotary shaft, the blade width direction β of the rotary blade 7 is inclined to lower right with respect to the horizontal center line α of the rotary shaft. The angle θ to the lower right is 30 degrees, for example.

The arm member b is mounted on the rotary shaft 4 by using the fixing member 35 similarly to the arm member a. Moreover, attachment of the rotary blade 7 to the arm member b can be also performed similarly to the attachment to the arm member a.

Arm Member c

Figure 8A:
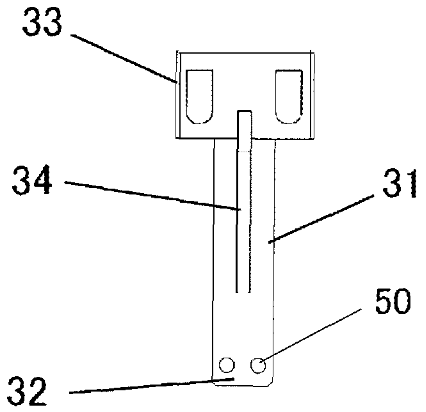
FIG. 8A is a front view of an embodiment of an arm member c.
Figure 8D:
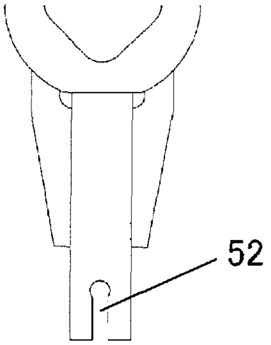
FIG. 8D is a side view of the arm member c illustrated in FIG. 8A.
Figure 8C:
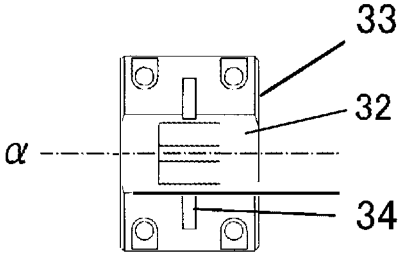
FIG. 8C is a bottom view of the arm member c illustrated in FIG. 8A.

FIG. 8A to FIG. 8C are views illustrating a state where the arm member c is mounted on the rotary shaft 4, in which FIG. 8A is a front view of the arm member c, FIG. 8B is a plan view, and FIG. 8C is a bottom view. Moreover, FIG. 8D is a side view of the arm member c.

The arm member c is mounted on both end portions in the axial direction of the rotary shaft 4 in the shredding device illustrated in FIG. 1A. The stirring blade 40 is attached to this arm member c. The arm member c has a structure that, when the arm member c to which the stirring blade 40 is attached is mounted on the rotary shaft 4, the blade width direction of the stirring blade 40 is in parallel with the horizontal center line α of the rotary shaft.

The arm member c is mounted on the rotary shaft 4 by using the fixing member 35 similarly to the arm member a. Moreover, the attachment of the stirring blade 40 to the arm member c can be also performed similarly to the attachment of the rotary blade 7 to the arm member a.

When the rotary blade 7 is attached with inclination to the horizontal center line of the rotary shaft as described above, a moving direction of the article to be processed in the housing 1 can be changed by changing a rotating direction of the rotary shaft 4.

In the device illustrated in FIG. 1A, when each of the arm members a to c is mounted as above, by rotating the rotary shaft 4 in a clockwise direction when seen from the right side of the housing 1, the article to be processed in the housing 1 is moved toward the center part of the housing 1 from the end plate side of the housing 1 as indicated by an arrow (In). Moreover, by rotating the rotary shaft 4 in a counterclockwise direction when seen from the ride side, the article to be processed on the right side from the center of the housing 1 is moved toward the end plate on the right side of the housing 1 as indicated by an arrow (Out), and the article to be processed on the left side from the center of the housing 1 is moved toward the end plate on the left side of the housing 1.

By repeating an operation of switching the rotating direction of the rotary shaft 4, the article to be processed is shredded uniformly by each of the rotary blades 7.

If the structure of the housing 1 is such a structure that the garbage can be thrown in uniformly into a space in the housing 1, only the arm member c illustrated in FIG. 8A to FIG. 8D is used, and it is only necessary to mount the rotary blade 7 on that without using the three types of the arm members as described above.

Next, a state at an initial stage of an operation when the garbage is thrown in will be described on the basis of FIG. 2A to FIG. 2D.

During an ordinary operation, the article to be processed can be shredded finely by shearing by the rotation of the arm member 6 in such a form that the rotary blade 7 bites into the fixed blade 3.

However, when garbage contained in a bag with a large capacity such as in bagged garbage is thrown into the shredding device, the large bag is hardly bitten by the fixed blade 3 and the rotary blade 7 in the state where the fixed blade 3 and the rotary blade 7 bite into each other as illustrated in FIG. 1D, and thus it takes longer to tear off the bag. Moreover, if the fixed blade 3 and the rotary blade 7 are in the state as illustrated in FIG. 1D, a gap between the fixed blade 3 and the rotary blade 7 is small, and if garbage coming out of the bag (fine articles to be processed) is bitten therein, a larger power is required for the rotation of the rotary shaft.

Therefore, in order to efficiently shred the article to be processed in a large bag, it is necessary to rapidly tear off the bag and to take the garbage out of the bag to the outside.

Thus, in order to realize taking the garbage out of the large bag efficiently and rapidly and to shred it after that, the rotary shaft is made capable of lifting in the present invention.

A lifting cylinder is preferable as a lifting device for making the rotary shaft capable of lifting.

Figure 2A:
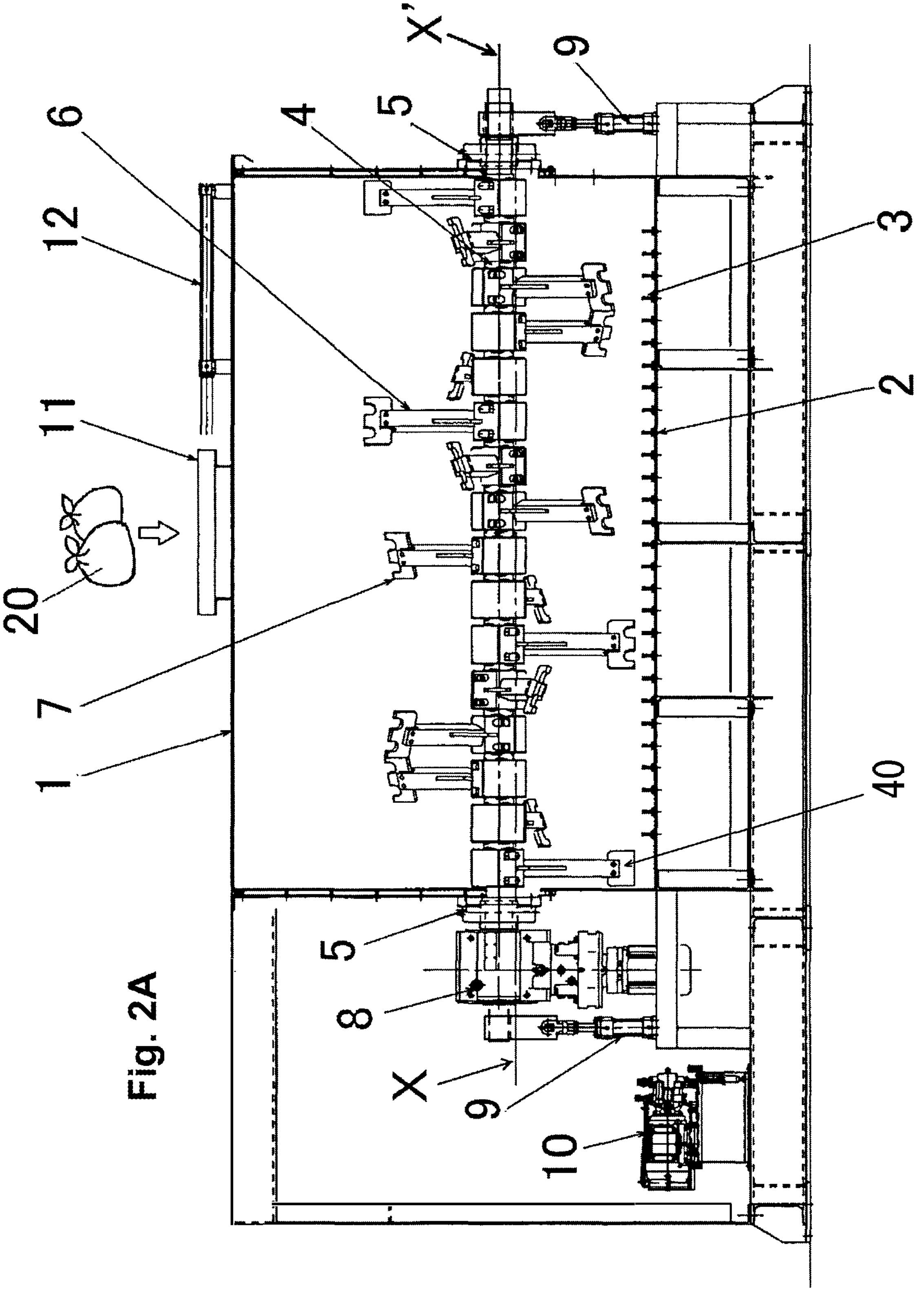
FIG. 2A is a view illustrating a state where the rotary shaft has been raised in the shredding device illustrated in FIG. 1A.
Figure 2B:
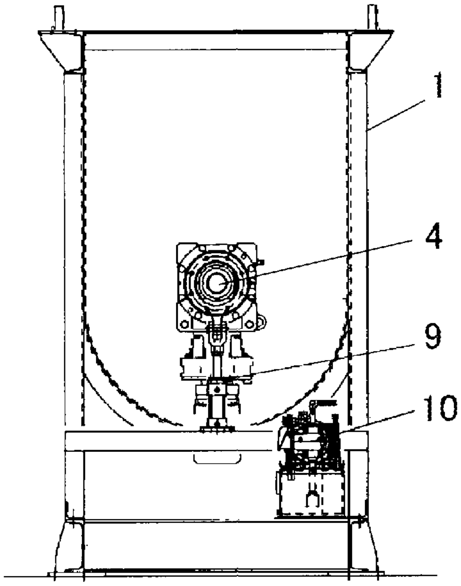
FIG. 2B is a left side view of the shredding device illustrated in FIG. 2A.
Figure 2C:
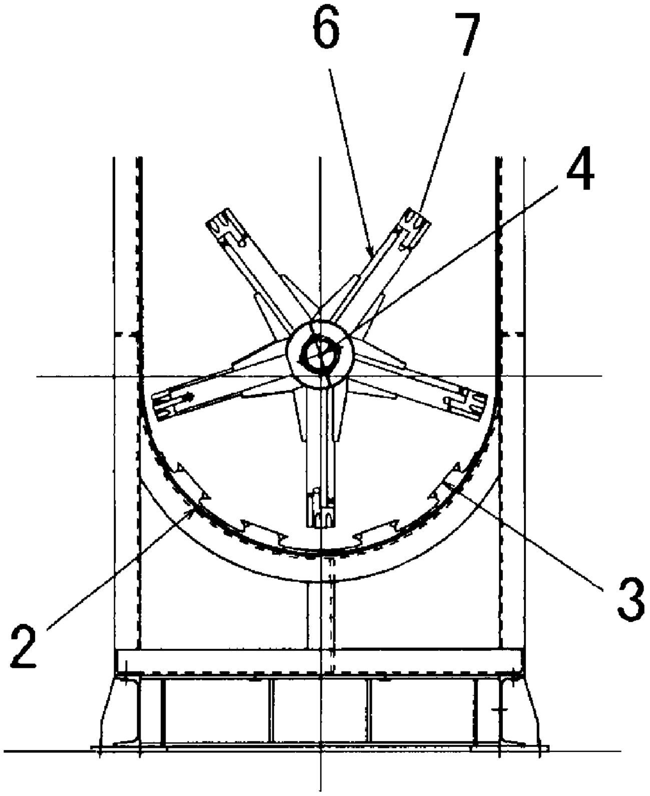
FIG. 2C is a right side view of the shredding device illustrated in FIG. 2A.

First, when the bagged garbage 20 is to be thrown in, as illustrated in FIG. 2A, a lifting cylinder 9 driven by a hydraulic unit 10 is driven so as to dispose the rotary shaft 4 at the raised position so that a distance between the fixed blade 3 and the rotary blade 7 is kept large, and bag tearing processing is started after the bagged garbage 20 is thrown in. Reference character X' in FIG. 2A denotes the horizontal center line of the rotary shaft when the rotary shaft is at the raised position, and reference character X denotes the horizontal center line of the rotary shaft when the rotary shaft 4 is at a lowered position.

Since the distance between the fixed blade 3 and the rotary blade 7 is large during the bag tearing processing, the rotary shaft 4 can be rotated with small power and thus, a rotation number of the rotary shaft 4 can be increased, and as a result, the bag can be torn rapidly.

As illustrated in FIG. 2D, when the rotary shaft is at the raised position, a distance d1 between a lower end surface of the rotary blade 7 and the bottom plate 2 is preferably larger than a distance d2 between an upper end surface of the fixed blade 3 and the bottom plate 2. More specifically, if d2 is 55 mm, for example, d1 is preferably 75 mm or more.

Then, when bag tearing processing time set by a timer in advance has elapsed, the rotary shaft 4 is lowered by the lifting cylinder 9 so as to be disposed at the lowered position, and the rotation number of the rotary shaft 4 is lowered.

When the rotary shaft 4 is disposed at the lowered position, the fixed blade 3 is brought into a state biting into the rotary blade 7 as illustrated in FIG. 1D, and the garbage coming out of the bag is shredded finely by the shearing force by the fixed blade 3 and the rotary blade 7.

Subsequently, when shredding processing time set by the timer in advance has elapsed, the garbage is discharged out of the housing to the outside.

Figure 10A:
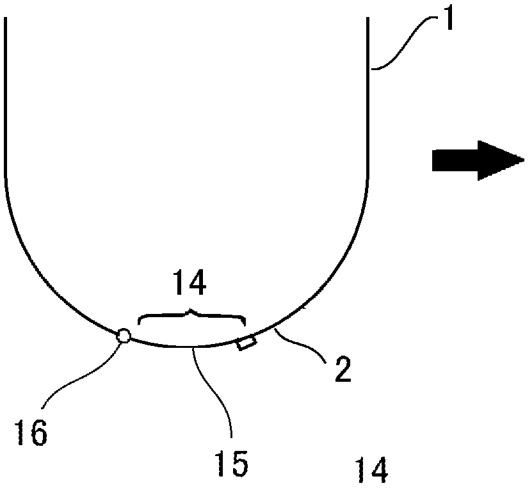
FIG. 10A and FIG. 10B are schematic diagrams illustrating an embodiment of a shredded article discharge mechanism provided on a bottom plate of the shredding device.
Figure 10B:
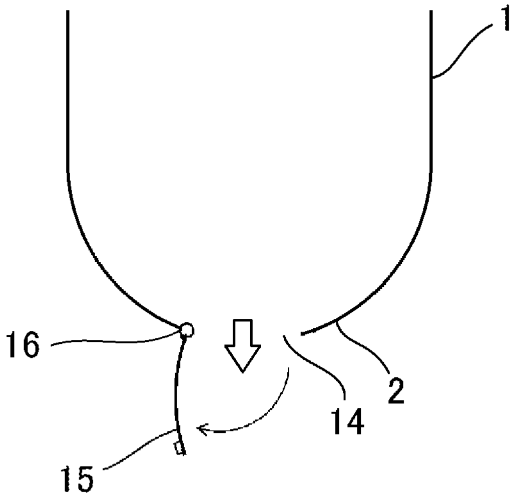

At the center part of the bottom plate 2 of the housing 1, an outlet 14 for discharging the processed garbage is provided as illustrated in FIG. 10. At this outlet 14, a hinge-type door 15 including a hinge 16 is provided. The door 15 is closed during the shredding, and by opening the door 15 when the shredding is finished, the processed garbage falls down and is carried out by a belt conveyer or the like.

After the garbage is discharged, the outlet 14 is closed again, the new bagged garbage 20 is thrown in through the garbage inlet 11 of the housing 1, and the bag tearing processing and the shredding are performed.

As described above, by making the rotary shaft capable of lifting and by rotating the rotary shaft at the raised position after the garbage is thrown in, bag tearing process time can be reduced, and the entire process time is reduced. Moreover, since the fixed blade and the rotary blade do not bite into each other in the bag tearing process, a load during the rotation of the rotary shaft is made smaller, and power can be saved.

REFERENCE NUMBER LIST

1 Housing (device body)
2 Bottom plate
3 Fixed blade
4 Rotary shaft
5 Bearing
6 Arm member
7 Rotary blade
8 Drive motor
9 Lifting device (lifting cylinder)
10 Hydraulic unit
11 Garbage inlet (with door)
12 Door-opening/closing cylinder
13 Inspection port
14 Outlet
15 Door
16 Hinge
20 Bagged garbage
31 Arm shaft
32 Rotary-blade mounting portion
33 Rotary-shaft mounting portion
34 Reinforcing member
35 Fixing member
40 Stirring blade
41 Top end portion of fixed blade
42, 43 Sharp angle portion
50 Bolt hole
51 Notch portion
52 Mounting groove
X Horizontal center line of rotary shaft when rotary shaft is lowered
X' Horizontal center line of rotary shaft when rotary shaft is raised

The invention claimed is:

1. A shredding device, comprising:
a housing;
a rotary shaft rotatably attached to an inside of the housing;
a plurality of rotary blades attached around the rotary shaft to be spaced apart from one another in an axial direction of the rotary shaft; and
a plurality of fixed blades attached to a bottom plate of the housing so that an article to be processed is shredded by the plurality of fixed blades in cooperation with the plurality of rotary blades, wherein
each of the plurality of fixed blades is made of a single blade stood upright on the bottom plate,
each of the rotary blades comprises, at an outer corner of a distal end portion of the rotary blade, a sharp, acute angle portion having an acute angle shape configured to shear a garbage bag, the acute angle shape being with respect to a circumferential direction of rotation of the rotary shaft relative to a side view of the shredding device, and
a lifting device which changes a distance between a tip of a rotary blade of the plurality of rotary blades and a tip of a corresponding fixed blade of the plurality of fixed blades by raising and lowering the rotary shaft is provided.

2. The shredding device according to claim 1, wherein the lifting device is a lifting cylinder.

3. The shredding device according to claim 1, wherein each rotary blade is attached to a tip of a corresponding arm member mounted on the rotary shaft in a perpendicular direction thereto.

4. The shredding device according to claim 3, wherein each of the arm members are mounted around the rotary shaft to be spaced apart from one another in the axial direction, with positions thereof in the circumferential direction being shifted.

5. The shredding device according to claim 1, wherein a notch portion, through which a corresponding fixed blade of the plurality of fixed blades passes when the rotary shaft is lowered, is provided at a tip end portion of each rotary blade.

6. The shredding device according to claim 1, wherein each fixed blade of the plurality of fixed blades comprises, at a top end portion of the fixed blade, end portions each having a sharp, acute angle shape of the fixed blade, the sharp, acute angle shape of each fixed blade being configured to pierce the garbage bag when the garbage bag is pushed into the plurality of fixed blades by the plurality of rotary blades.

7. The shredding device according to claim 3, wherein three different configurations of the arm members, which are, an arm member a, an arm member b, and an arm member c below are mounted on the rotary shaft:

the arm member a having a structure to be mounted on a portion of the rotary shaft that excludes a right-side end portion on a right side from a center in the axial direction of the rotary shaft and mounted so that a blade width direction of a corresponding rotary blade of the plurality of rotary blades mounted to a tip end portion of the arm member a is inclined to lower left with respect to a horizontal center line of the rotary shaft, the arm member b having a structure to be mounted on a portion of the rotary shaft that excludes a left-side end portion on a left side from a center in the axial direction of the rotary shaft and mounted so that the blade width direction of a corresponding rotary blade of the plurality of rotary blades mounted to a tip end portion of the arm member b is inclined to lower right with respect to the horizontal center line of the rotary shaft, the arm member c having a structure to be mounted on opposite ends of the rotary shaft and mounted so that a width direction of a stirring blade mounted to a tip end portion of the arm member c is in parallel with the horizontal center line of the rotary shaft, where the axial direction of the rotary shaft of the shredding device is a right-and-left direction.

8. The shredding device according to claim 6, wherein the sharp, acute angle shape of each fixed blade is a first sharp, acute angle shape for the fixed blade, and further comprising a second sharp, acute angle shape of the fixed blade located on the top end portion of the fixed blade opposite to the first sharp, acute angle shape.

* * * * *